(12) United States Patent
Sato

(10) Patent No.: US 6,220,489 B1
(45) Date of Patent: Apr. 24, 2001

(54) FOLDING CLOTHES HANGER

(75) Inventor: Daisuke Sato, Tokyo (JP)

(73) Assignee: Jin Tay Industries, Co., Ltd., Tai Shan Hsiang (TW)

( * ) Notice: Subject to any disclaimer, the term of this patent is extended or adjusted under 35 U.S.C. 154(b) by 0 days.

(21) Appl. No.: 09/657,750

(22) Filed: Sep. 8, 2000

(51) Int. Cl.[7] .................................................. A47G 25/40
(52) U.S. Cl. ...................... 223/94; 223/DIG. 4; 224/927
(58) Field of Search ................................ 223/85, 88, 89, 223/94, DIG. 4; 224/927

(56) References Cited

U.S. PATENT DOCUMENTS

| 1,722,122 | * | 7/1929 | Wilson | 224/927 |
| 2,196,196 | * | 4/1940 | Dorsey | 224/927 |
| 4,957,230 | * | 9/1990 | Gonzales | 224/927 |
| 5,040,707 | * | 8/1991 | Ayano et al. | 223/89 |
| 5,058,790 | * | 10/1991 | LaVelle | 224/927 |

\* cited by examiner

Primary Examiner—Bibhu Mohanty
(74) Attorney, Agent, or Firm—Fitch, Even, Tabin & Flannery

(57) ABSTRACT

A folding clothes hanger has a body having two arms respectively provided at two sides thereof, and which are able to be extended transversely. An adjusting bar is formed at a central portion of the body and has a plurality of recesses longitudinally defined in a first face of the bar. A base for the adjusting bar movably provided in a central portion thereof, has two chambers defined in a bottom face thereof and respectively at two sides thereof, and a clip pivotally mounted at the central portion thereof. The clip has a stop formed at an upper portion thereof to engage with one of the recesses and a spring is provided between the base and a lower portion of the clip. Two hooks each have a rear end engaged in the respective chamber of the base, and a front end for attaching on a backrest of a seat or the like.

6 Claims, 6 Drawing Sheets

FOLDING CLOTHES HANGER

BACKGROUND OF THE INVENTION

1. Field of the Invention

The present invention is related to a clothes hanger, and more particularly to a folding clothes hanger which is able to be attached on a backrest of a chair or the like.

2. Description of Related Art

Referring to FIG. 10, a conventional clothes hanger which is able to be attached on a backrest (a) has a body (b) and a claw-fastener (c). In use, the claw-fastener (c) is attached to the backrest, and a garment can be draped on the body (b). However, when there is no garment hung on the body (b), the clothes hanger will make some inconvenience because of its protuberant appearance due to it being unable to be folded.

Therefore, it is an objective of the invention to provide a foldaway clothes hanger to mitigate and/or obviate the aforementioned problems.

SUMMARY OF THE INVENTION

The main objective of the present invention is to provide a clothes hanger which is able to be folded when not in use.

Another objective of the present invention is to provide a clothes hanger which is able to be attached on a backrest of a chair or the like.

Other objects, advantages and novel features of the invention will become more apparent from the following detailed description when taken in conjunction with the accompanying drawings.

DETAILED DESCRIPTION OF THE PREFERRED EMBODIMENT

Figure 1:
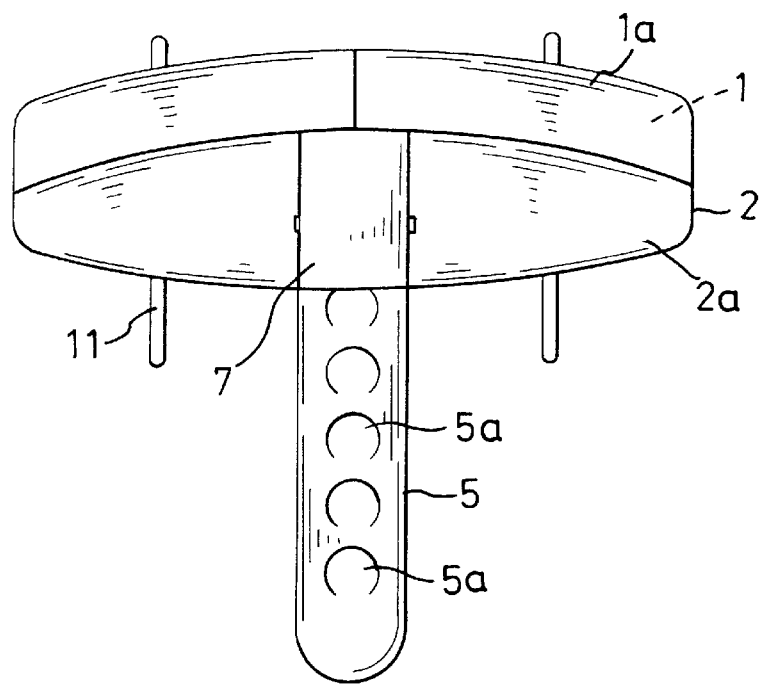
FIG. 1 is a front view of a clothes hanger in accordance with the invention.
Figure 2:
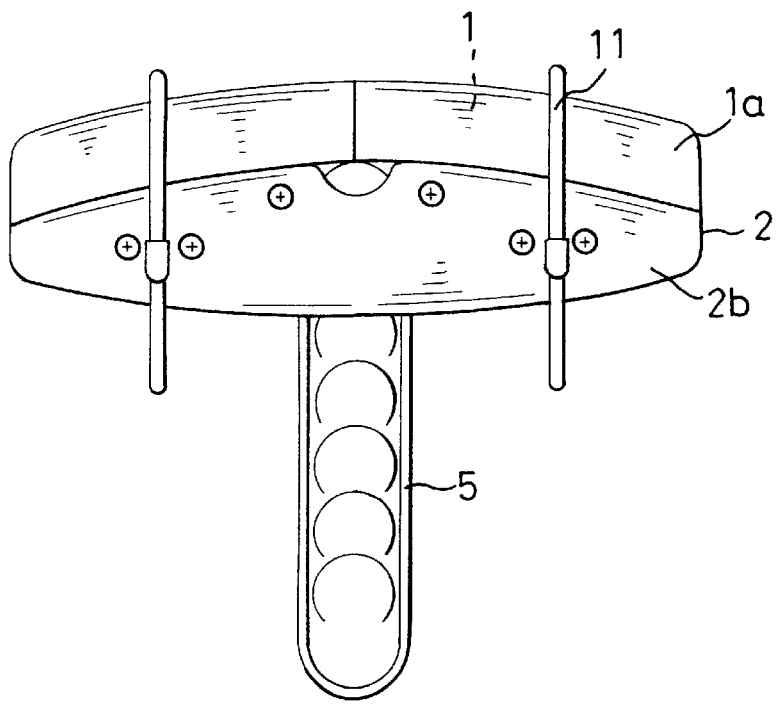
FIG. 2 is a back view of the clothes hanger of FIG. 1.

Referring to FIGS. 1–5, a clothes hanger in accordance with the invention is composed of a body (1), a base (2) and two hooks (11).

The body (1) has two arms (1a) respectively provided at two sides thereof, and which can be transversally extended. An adjusting bar (5) is formed at a central portion of a bottom of the body (1) and extends through a central portion of the base (2) and can be moved in a longitudinal direction. A plurality of recesses (5a) is longitudinally defined in a front surface of the adjusting bar (5).

The base (2) consists of a front part (2a) and a rear part (2b). The adjusting bar (5) is provided between the front part (2a) and the rear part (2b). Especially referring to FIG. 5, a clip (7) is pivotally mounted on a central portion of the front part (2a) by a pivot pin (8) and has a stop (7a) formed at an upper portion thereof and corresponding to the recesses (5a) of the adjusting bar (5). A spring (9) is provided between the front part (2a) and a lower portion of the clip (7). The adjusting bar (5) is positioned by the stop (7a) pushing against one of the recesses (5a) under the force of the spring (9).

Figure 4:
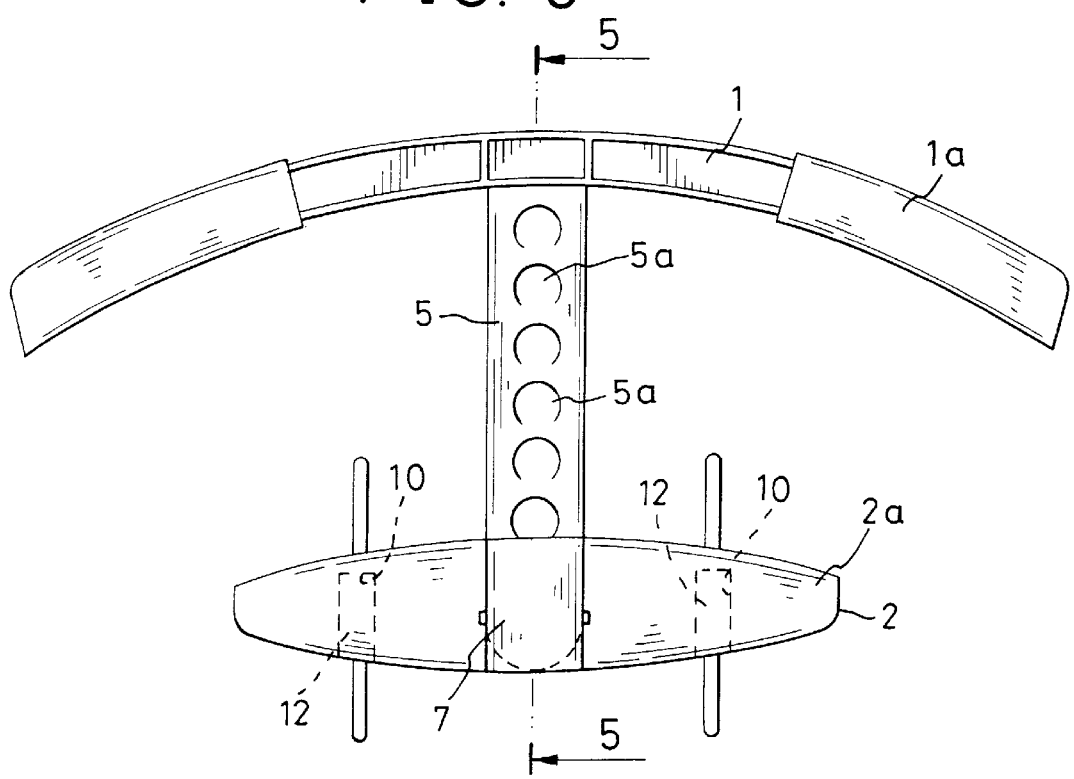
FIG. 4 is a schematic view showing that an adjusting bar of the clothes hanger is pulled upwards and two arms of the clothes hanger are extended outwards.
Figure 5:
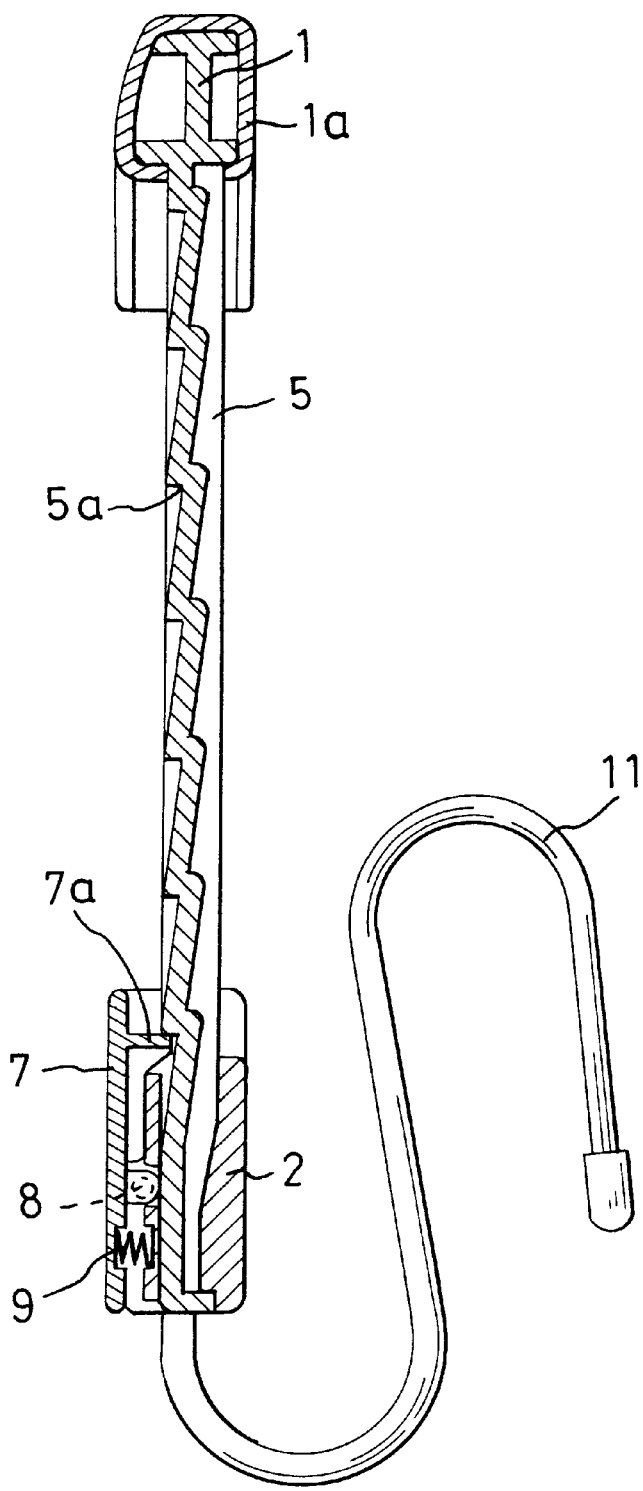
FIG. 5 is a sectional view along the line "5—5" of FIG. 4.
Figure 7:
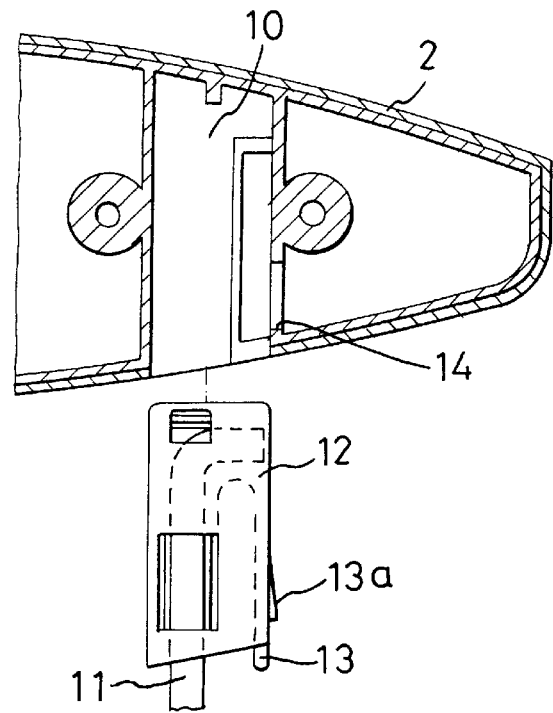
FIG. 7 is a schematic view showing that a fixed sleeve is released from a chamber of a base.
Figure 8:
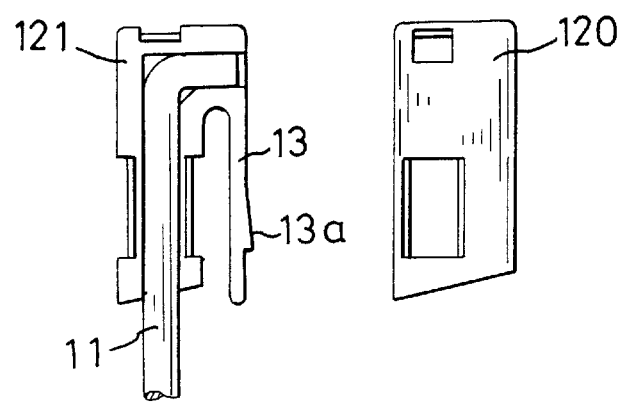
FIG. 8 is an exploded view of the fixed sleeve in accordance with the invention.
Figure 10:
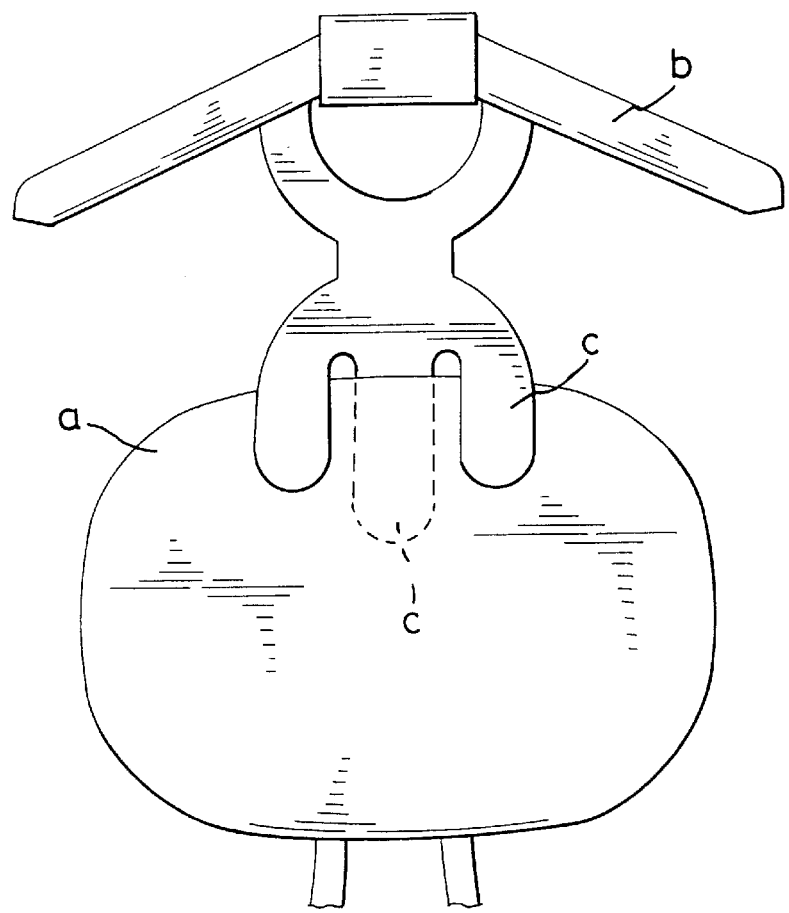
FIG. 10 is a front view of a conventional clothes hanger attached on a backrest of a chair.

Referring to FIGS. 4 and 7, the base (2) has two chambers (10) symmetrically defined in a bottom face and at two sides thereof. The chambers (10) each have an aperture (14) defined in an inner wall thereof. The hooks (11) respectively provided at two sides of the base (2) each have a fixed sleeve (12) formed at a rear end thereof and engaged in a respective one of the chambers (10). The fixed sleeve (12), which can be made of synthetic resin, is shown in FIG. 8. The fixed sleeve (12) is composed of an upper part (120) and a lower part (121). The rear end of the hook (11) is received in a first side of the lower part (121) and a flexible fastener (13) is formed at a second side of the lower part (121). The flexible fastener (13) has a lug (13a) formed at an outer side thereof. When the fixed sleeves (12) are respectively inserted in the chambers (10), the lugs (13a) are attached in the aperture (14) to fasten the fixed sleeves (12) in the chambers (10). The two fixed sleeves (12) are also symmetrical to each other for corresponding to the chambers (10). Namely, if in the fixed sleeve (12) shown in FIG. 8 the rear end of the hook (11) is at the left side and the flexible fastener (13) is at the right side, then in the other fixed sleeve (12) (not shown) the rear end of the hook (1) is at the right side and the flexible fastener (13) is at the left side.

Figure 6:
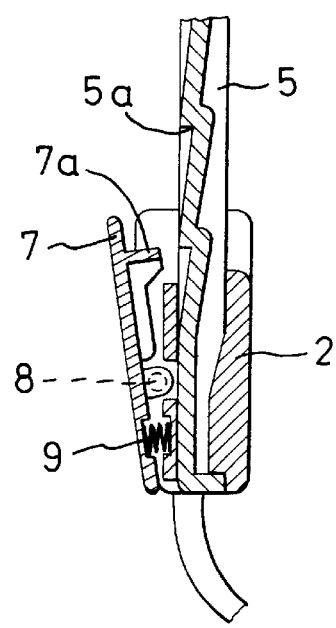
FIG. 6 is a schematic view showing a clip of the clothes hanger being pressed.

FIG. 4 shows the clothes hanger is in use, in which the arms (1a) are extended outwards and the adjusting bar (5) is pulled upwards and positioned by the clip (7). In this case, a garment can be draped on the extended body (1) of the clothes hanger. When a user wants to change the height of the body (1), the lower portion of the clip (7) is pressed to disengage the stop (7a) from the respective recess (5a), then the adjusting bar (5) is able to be moved upwards or downwards, as shown in FIG. 6. Afterwards, by releasing the clip (7), the stop (7a) will engage with another recess (5a) at a desired height under the force of the spring (9) to position the adjusting bar (5).

Figure 3:
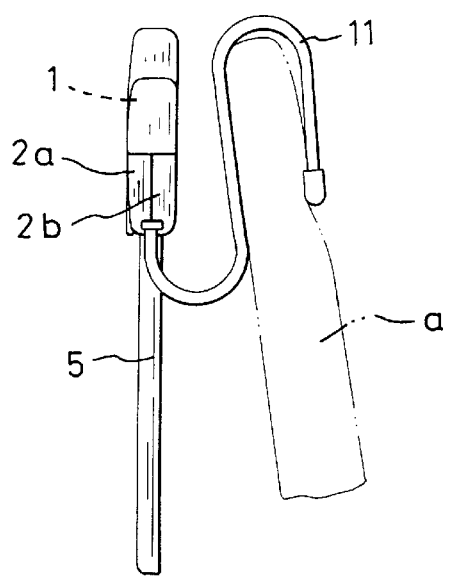
FIG. 3 is a side view of the clothes hanger in accordance with the invention.
Figure 9:
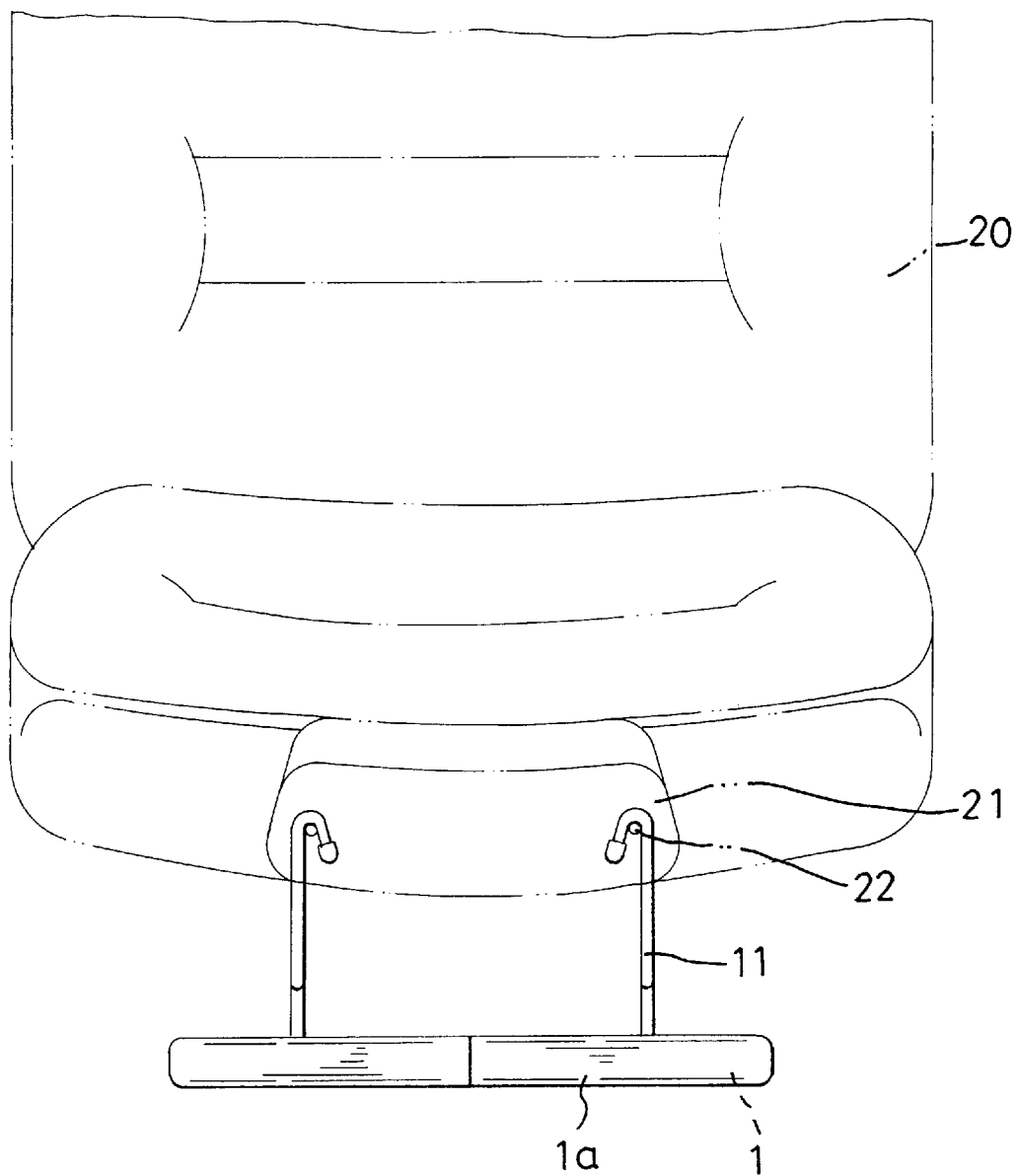
FIG. 9 is schematic view of another embodiment of the invention.

In this embodiment of the invention, the hooks (11) each have a vertical front end directly attaching on a backrest (a) of a seat, as shown in FIG. 3. In a second embodiment of the hook (11) shown in FIG. 9, the vertical front end is replaced with a horizontal front end to attach a pole (22) formed on a top of a headrest (21) of a seat (20).

When a user wants to replace the hooks (11) that have deformed after a long term using with new ones, the fixed sleeves (12) can be disengaged from the chambers (10) by pressing the flexible fasteners (13) to detach the lugs (13a) from the apertures (14).

When not in use, the clothes hanger in accordance with the invention can be folded to reduce its volume by pushing the adjusting bar (5) downwards and retracting the arms (1a) inwards, so it is easy to carry or store. Even if the clothes hanger is still hooked on the backrest, it will not make any inconvenience for the user.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A folding clothes hanger comprising:

a body (1) having two arms (1a) respectively provided at two opposed sides thereof and which are able to be extended transversely, and an adjusting bar (5) formed at a central portion thereof and having a plurality of recesses (5a) longitudinally defined in a first face of the bar (5), the adjusting bar (5) extending through a central portion of a base (2) and being movable in a longitudinal direction;

the base (2) having two chambers (10) defined in a bottom face thereof and respectively at two sides thereof, a clip (7) pivotally mounted at the central portion thereof, the clip (7) having a stop (7a) formed at an upper portion of the clip (7) and engaging with one of the recesses (5a), and a spring (9) provided between the base (2) and a lower portion of the clip (7); and two hooks (11) each having a rear end engaged in the respective chamber (10) of the base (2), and a front end for attaching on a backrest of a seat or the like.

2. The clothes hanger as claimed in claim 1, wherein the rear end of the hook (11) is received in a fixed sleeve (12), and the fixed sleeve (12) is engaged in the chamber (10).

3. The clothes hanger as claimed in claim 2, wherein the fixed sleeve (12) further comprises a flexible fastener (13) formed at a side thereof, and a lug (13a) formed at an outer side of the flexible fastener (13).

4. The clothes hanger as claimed in claim 3, wherein the chamber (10) further comprises an aperture (14) defined at an inner wall thereof for the lug (13a) to attach therein, to engage the fixed sleeve (12) in the chamber (10).

5. The clothes hanger as claimed in claim 1, wherein the front ends of the hooks (11) are vertical configurations directly attaching on the backrest or the like.

6. The clothes hanger as claimed in claim 1, wherein the front ends of the hooks (11) are horizontal configurations attaching on a pole (22) provided on a top of the backrest or the like.

* * * * *